No. 850,419. PATENTED APR. 16, 1907.
J. H. CAYFORD.
APPARATUS FOR SEPARATING LIQUIDS OF DIFFERENT SPECIFIC GRAVITIES.
APPLICATION FILED NOV. 29, 1905.
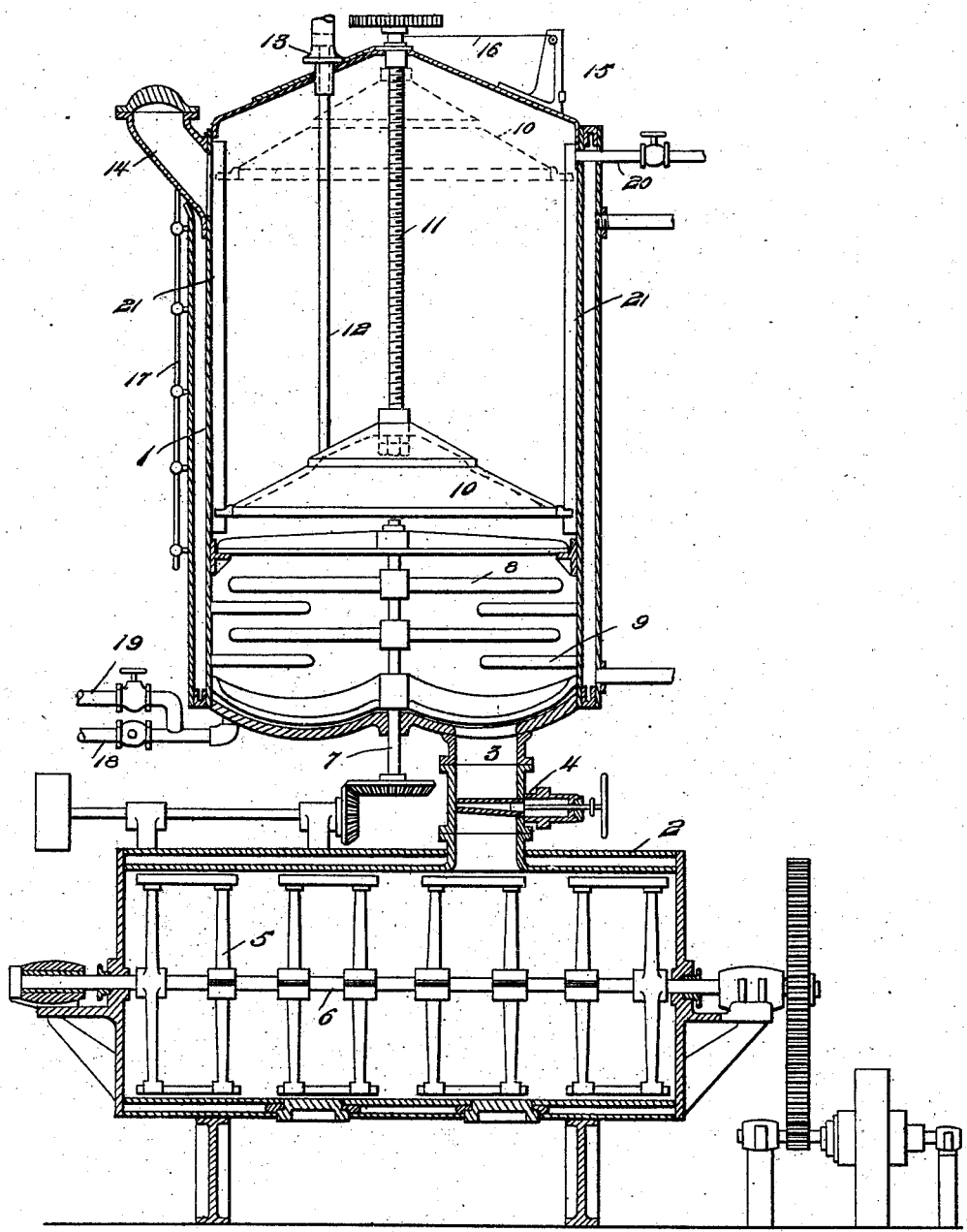
Inventor
James H. Cayford,
By
K. P. McElroy
Attorney
Witnesses

UNITED STATES PATENT OFFICE.

JAMES HERBERT CAYFORD, OF BUENOS AYRES, ARGENTINA.

APPARATUS FOR SEPARATING LIQUIDS OF DIFFERENT SPECIFIC GRAVITIES.

No. 850,419.  Specification of Letters Patent.  Patented April 16, 1907

Application filed November 29, 1905. Serial No. 289,620.

*To all whom it may concern:*

Be it known that I, JAMES HERBERT CAYFORD, a subject of the King of Great Britain, at present residing in the city of Buenos Ayres, Argentina, have invented certain new and useful Improvements in Apparatus for Separating Liquids of Different Specific Gravities, of which the following is a specification.

My invention relates to improvements in apparatus for separating liquids of different specific gravities, and especially to apparatus for separating oil and grease from water and solids, and relates to that type of apparatus for such purpose covered by the two patents to D. H. Haywood, Nos. 675,891 and 675,949, both dated June 11, 1901. The said patents describe separators intended to be used in connection with a suitable digester and to receeive the contents of the digester after the same have been treated therein to liberate the oil and grease, the separation of such oil and grease from the liquid and solid material being accomplished in the separator by forcing such oil and grease upward through a discharge-orifice by means of pneumatic pressure.

The apparatus herein described is primarily intended for use as a combined digester and separator, in which the oil and grease bearing material may be treated to liberate the oil and grease, which are then separated from the remaining contents of the vessel by means of pneumatic or steam pressure, as described in the said patents to Haywood, but without transfer of the material to a special separator for that purpose.

It sometimes happens that rendering apparatus such as that to which the invention relates must be erected in buildings where there is not sufficient vertical space available to permit the use of a separator and a digester above the same, as illustrated and described, for example, in the patent to N. B. Powter, No. 668,211, dated February 19, 1901. Also in the treatment of some materials it is undesirable to transfer the material treated from a digester to a separator, because if this is done a portion of the oil and grease is apt to form an emulsion with the water, and from this emulsion it is difficult to extract the oil and grease.

The objects of my invention are to accomplish the digestion of oil and grease bearing material and the separation of the oil and grease from the remaining materials by pneumatic or other fluid pressure in a single vessel, to improve the construction of separators, to permit the charging of the vessel to its full capacity, and to make the apparatus as simple, compact, and effective as possible.

I will now proceed to describe my invention with reference to the accompanying drawing, in which one form of combined digester and separator is shown in connection with a suitable drier, both digester and drier being shown in central vertical section, and will then point out the novel features in claims. The said drawing illustrates a combined digester and separator 1, which may be jacketed, as shown, to permit heating of its contents, and a drier 2, connected to the combined digester and separator by a passage 3, arranged to be closed by a valve 4. The drier 2 may be of any ordinary construction. That shown is an ordinary horizontal steam-jacketed cylinder having within it stirring-arms 5, mounted on and arranged to be rotated by a shaft 6.

The combined digester and separator in the form shown is a vertical cylindrical vessel having within it a short vertical stirring-shaft 7, upon which are a plurality of stirring-blades 8. Stationary blades 9 project from the sides of the vessel 1 intermediate said blades 8. Within the vessel 1 there is also an inverted funnel or cone 10. This funnel is supported by and rotated on a vertical screw 11, shaft 11 having a suitable bearing in the top of vessel 1, adapted to be rotated by any suitable means. The cone is provided with a collar forming a nut on this screw and is held against rotation by guides 21, secured to the sides of vessel 1, so that when the screw is rotated the cone does not rotate, but moves up or down within the vessel 1, according to the direction in which the screw is rotated. The shaft on which screw 11 is formed extends to and through the top of the vessel, being prevented from rising by a collar below the top, and above the vessel is provided with suitable means for rotation. Thread 11 of course extends merely to the collar.

To the cone is connected an oil-discharge pipe 12, arranged to rise and fall with the cone and to telescope within a stationary oil-discharge pipe 13, projecting from the top of vessel 1. The charging-passage 14 is near the top of vessel 1 and communicates with said vessel at the side thereof. The cone is arranged to move upward until it clears the orifice of the charging-passage, and so does not impede the entrance of the material to be treated into the vessel. This makes it possible to charge the vessel up to the level of the charging-orifice, and thus to utilize the full capacity of the vessel.

In the drawing the cone is shown in dotted lines in its extreme upper position.

A suitable index 15, operated in any suitable way—as, for example, by a cord 16, arranged to wind upon or to unwind from the portion of the threaded shaft extending above the vessel—indicates the position of the cone at all times. Gage-glasses 17 are provided for showing the level of the oil and water in the digester. Connections 18 and 19 for admitting water and steam are provided.

In the operation of this apparatus to introduce a charge therein the cone is run up to the top of the vessel and the charge admitted through the charging-passage. The latter is then closed and the material within the digester treated in the ordinary manner by cooking with steam, with or without a chemical reagent. During this time it is customary to rotate the stirring-shaft. After the treatment has continued for a sufficient time the rotation of the stirrer-shaft is stopped and the contents of the digester are allowed to settle, whereupon they will arrange themselves according to their respective specific gravities with the oil and grease on top. Steam or air under pressure is then introduced into the digester above the surface of the liquid through pipe 20, and thereby the oil and grease is forced outward through discharge-pipe 13, cone 10 being gradually lowered by rotating the screw 11 as the level of the liquid falls, as shown by the gage-glasses. In this way substantially all of the oil and grease may be removed.

I do not limit myself to the use of my invention for the particular purpose herein described, nor to the particular details of construction herein illustrated and described.

What I claim is—

1. In an apparatus for separating liquids of different specific gravities, the combination of a liquid-containing vessel, provided with means for introducing a charge at the side thereof, a vertically-adjustable funnel movably mounted within said vessel and connected to a discharge-conduit thereof, means for moving the same from a point below to a point above the charging-orifice, and means for creating in such vessel a greater pressure than in the discharge-conduit.

2. In an apparatus for separating liquids of different specific gravities, the combination of a liquid-containing vessel, provided with means for introducing a charge at the side thereof, a vertical screw-shaft therein adapted to be rotated, a vertically-adjustable funnel mounted upon said screw-shaft and forming a nut therefor, and vertically-movable within said vessel from a point below to a point above the bottom of the charging-opening, and means for carrying away liquid from said funnel.

3. In an apparatus for separating liquids of different specific gravities, the combination of a liquid-containing vessel, provided with means for introducing a charge at the side thereof, a vertical screw-shaft therein adapted to be rotated, a vertically-adjustable funnel mounted upon said screw-shaft and forming a nut thereof, and vertically movable within said vessel from a point below to a point above the bottom of the charging-opening, a discharge-conduit to which the funnel is connected, and means for creating in such vessel a greater pressure than in the discharge-conduit.

4. In an apparatus for separating liquids of different specific gravities, the combination of a liquid-containing vessel having a discharge-pipe, a vertical screw-shaft arranged to be rotated, and a funnel mounted on said screw-shaft and forming a nut thereof, and having a telescopic connection with such discharge-pipe for carrying away oil and grease.

5. In a combined digester and grease-extractor, the combination of a cylindrical liquid-containing vessel, stirring and agitating means in the base thereof, a valved charging-inlet on the side near the top, a rotatable threaded shaft extending through the top to a point near the stirring mechanism, a non-rotatable inverted funnel threaded on the shaft and adapted to travel from the end of the shaft to a point above said inlet, and grease-tapping means connected to said funnel.

6. In a combined digester and grease-extractor, the combination of a cylindrical liquid-containing vessel, internally-projecting blades in the base thereof, a rotatable stirrer in the base with arms mounted to rotate between said blades, a valved charging-inlet on the side of the vessel near the top, a rotatable threaded shaft extending through the top to a point near the stirring mechanism, a non-rotatable inverted funnel threaded on the shaft and adapted to travel from the end of the shaft to a point above said inlet, and grease-tapping means connected to said funnel.

In testimony whereof I affix my signature in the presence of two witnesses.

JAMES HERBERT CAYFORD.

Witnesses:
D. E. MILLER,
WM. N. YARROW.